(12) United States Patent
Itoh et al.

(10) Patent No.: US 12,152,962 B2
(45) Date of Patent: Nov. 26, 2024

(54) TIRE TESTING APPARATUS HAVING A PLURALITY OF SENSORS ON THE OUTER CIRCUMFERENTIAL SURFACE OF A DRUM

(71) Applicant: A&D Company, Limited, Tokyo (JP)

(72) Inventors: Yukihisa Itoh, Kitamoto (JP); Yoichi Kaneko, Kitamoto (JP); Kazuki Kido, Kitamoto (JP); Kazuki Okamoto, Kitamoto (JP); Toru Tsuda, Kitamoto (JP)

(73) Assignee: A&D Company, Limited, Tokyo (JP)

( * ) Notice: Subject to any disclaimer, the term of this patent is extended or adjusted under 35 U.S.C. 154(b) by 308 days.

(21) Appl. No.: 17/763,448

(22) PCT Filed: May 11, 2020

(86) PCT No.: PCT/JP2020/018811
§ 371 (c)(1),
(2) Date: Mar. 24, 2022

(87) PCT Pub. No.: WO2021/070410
PCT Pub. Date: Apr. 15, 2021

(65) Prior Publication Data
US 2022/0291087 A1 Sep. 15, 2022

(30) Foreign Application Priority Data
Oct. 8, 2019 (JP) ................................. 2019-185348

(51) Int. Cl.
*G01M 17/02* (2006.01)
(52) U.S. Cl.
CPC .................... *G01M 17/02* (2013.01)

(58) Field of Classification Search
None
See application file for complete search history.

(56) References Cited

U.S. PATENT DOCUMENTS 8,011,235 B2 *  9/2011  Berry ................... G01M 17/02
                                             73/146
10,281,361 B2 *  5/2019  Fujiwara ............. G01M 17/022
(Continued)

FOREIGN PATENT DOCUMENTS

JP       2005-343281 A     12/2005
JP       2006-226778 A      8/2006
(Continued)

*Primary Examiner* — Peter J Macchiarolo
*Assistant Examiner* — Jermaine L Jenkins
(74) *Attorney, Agent, or Firm* — Locke Lord LLP; James E. Armstrong, IV; Nicholas J. DiCeglie, Jr.

(57) ABSTRACT

A tire testing apparatus performs the test by rotating a tire while the tire is in contact with a drum. A plurality of sensors are provided on the outer circumferential surface of the drum and are arranged side by side along a widthwise direction of the drum, thereby measuring the ground contact forces at the ground contact position with the tire. A calculation unit obtains, based on the ground contact forces measured by the sensors, a displacement amount Dy of the ground contact position in the widthwise direction and a change amount $\Delta Fy$ of the ground contact force Fy in the widthwise direction which corresponds to the displacement amount Dy, thereby calculating the lateral stiffness sharing rate Ky rib on the basis of the displacement amount Dy and the change amount $\Delta Fy$.

3 Claims, 10 Drawing Sheets

(56) References Cited

U.S. PATENT DOCUMENTS

| | | | |
|---|---|---|---|
| 11,029,235 B2* | 6/2021 | Cuttino | G01M 17/02 |
| 2001/0020386 A1* | 9/2001 | Mancosu | G06F 30/15 |
| | | | 73/146 |
| 2006/0123897 A1 | 6/2006 | Monguzzi et al. | |
| 2019/0113440 A1* | 4/2019 | Koike | G07C 5/0808 |
| 2022/0026311 A1* | 1/2022 | Ito | G01M 17/02 |

FOREIGN PATENT DOCUMENTS

| | | | | |
|---|---|---|---|---|
| JP | 2006-256406 A | | 9/2006 | |
| JP | 2014-137326 A | | 7/2014 | |
| JP | 2019-120525 A | | 7/2019 | |
| WO | 2005/016670 A1 | | 2/2005 | |
| WO | WO-2017080838 A1 | * | 5/2017 | G01M 17/022 |

* cited by examiner

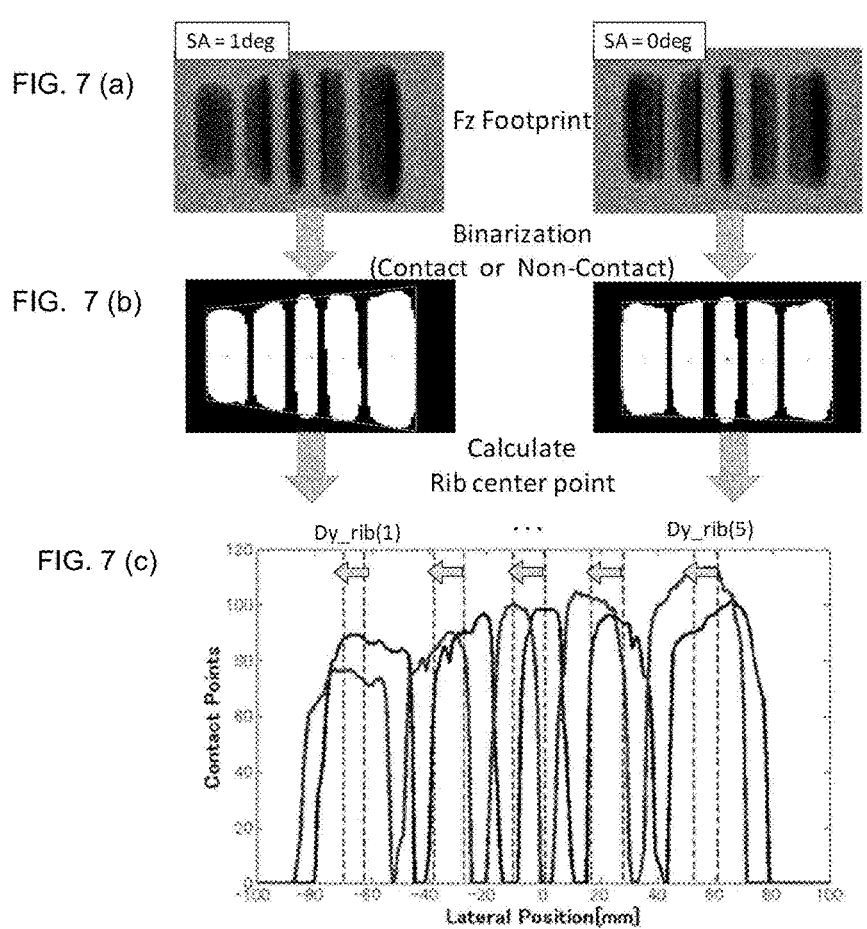
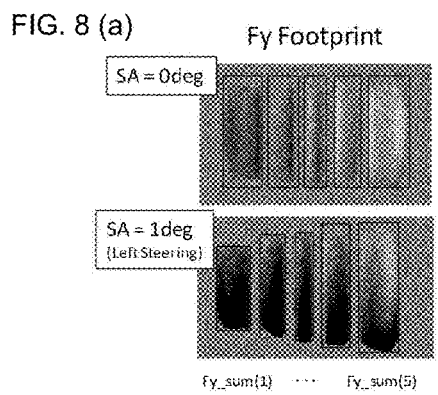
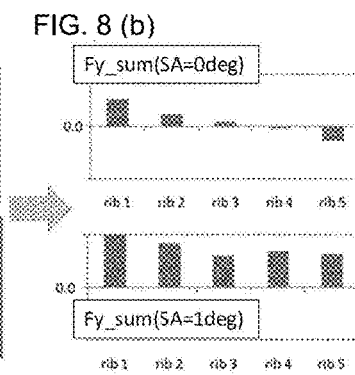
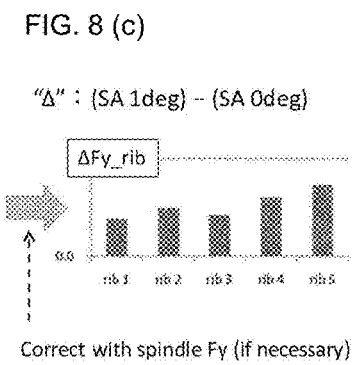

FIG. 12 (a)
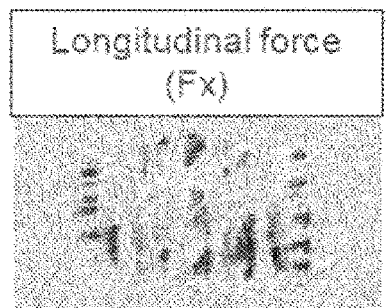
FIG. 12 (b)
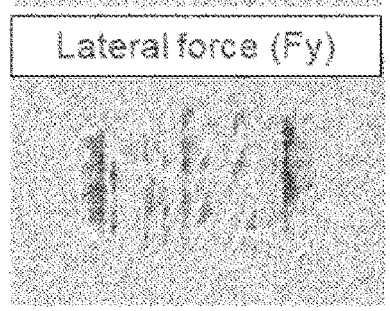
FIG. 12 (c)
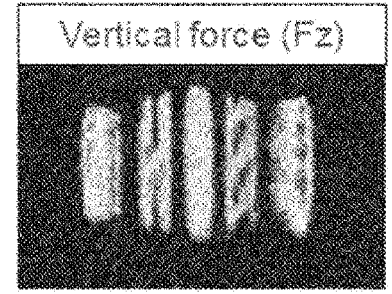
FIG. 13 (a)
FIG. 13 (b)
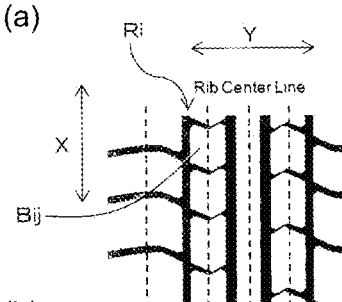
FIG. 13 (c)
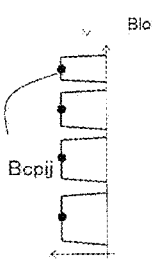
FIG. 13 (d)
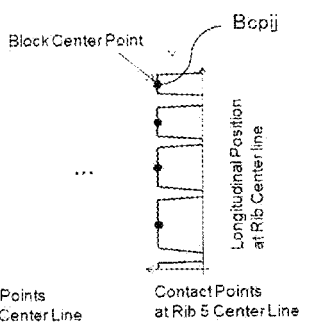

TIRE TESTING APPARATUS HAVING A PLURALITY OF SENSORS ON THE OUTER CIRCUMFERENTIAL SURFACE OF A DRUM

TECHNICAL FIELD

The present invention relates to a tire testing apparatus, and more particularly to a drum-type tire testing apparatus for performing a test by rotating a tire on a drum.

BACKGROUND ART

A tire testing apparatus of the prior art is generally configured with an axial force sensor (component force sensor) installed on a spindle shaft on which a tire is attached, and an apparatus adopting such a structure is proposed in Patent Literature 1.

Specifically, the invention described in Patent Literature 1 obtains a transient lateral stiffness, to thereby evaluate the performance of a tire. In the invention described in Patent Literature 1, the side surface of the tire is photographed with a camera while the slip angle is changed over time, and the transient lateral deformation amount of the tire is obtained from the photographed image, and the transient axial force is measured by the tire support mechanism (by the axial force sensor of the spindle shaft), to thereby determine the transient lateral force of the tire. Then, the lateral stiffness is calculated from the obtained lateral deformation amount and the lateral force, thereby performing a sensory evaluation of the tire by using the peak value of the lateral stiffness.

CITATION LIST

Patent Literature

Patent Literature 1: JP 2019-120525 A

SUMMARY OF INVENTION

Technical Problem

Meanwhile, since the distribution of the force generated in the tire-ground contact surface is not uniform, if it is possible to understand how much force each ground contact portion of the tire exerts (or does not exert) in a dynamic state of the tire, it is useful for the development and the elucidation of the mechanism of the tire.

However, since Patent Literature 1 obtains the lateral force of the tire from the axial force of the tire support mechanism, there is a problem that the lateral stiffness can be obtained only for the tire as a whole and cannot be used for sufficient analysis.

Specifically, since the invention described in Patent Literature 1 calculates the lateral stiffness of the tire as a whole, it may be possible to analyze how much force the tire can exert with respect to the slip angle, but it is not possible to understand the stiffness of each region of the tire-ground contact area. As a result, the invention described in Patent Literature 1 cannot be used for sufficient analysis of the tire characteristics. In addition, the invention described in Patent Literature 1 cannot provide data necessary for designing and developing a tire pattern capable of giving desired performance.

The present invention has been made in view of such circumstances, and an object thereof is to provide a tire testing apparatus in which the stiffness sharing rate and stiffness distribution of each region of the ground contact portion is obtained instead of the stiffness of the tire as a whole, thereby making it possible to use these in the analysis of the tire and the design and development of tire patterns.

Solution to Problem

The present invention made to solve the above problems is a drum-type tire testing apparatus for performing a test by rotating a tire while it is in contact with a drum, the apparatus including a plurality of sensors provided on an outer circumferential surface of the drum and arranged side by side along a widthwise direction of the drum, thereby to measure the ground contact force at the tire-ground contact position, and a calculation unit for obtaining, based on the ground contact forces measured by the sensors, the displacement amount of the ground contact position along the widthwise direction and the change amount of the ground contact force in the widthwise direction corresponding to the displacement amount of the ground contact position, thereby calculating the lateral stiffness based on the displacement amount and the change amount of the ground contact force.

Further, it is preferable for the calculation unit to: obtain a ground contact force distribution based on the ground contact force measured by the sensor; divide the entire ground contact surface of the tire into a plurality of regions along the widthwise direction based on the ground contact force distribution; obtain the change amount in the cumulative value of the ground contact forces of the divided regions along the widthwise direction and the displacement amount at the center position of the region; and calculate the lateral stiffness for each region from the change amount in the cumulative value and the displacement amount at the center position.

As described above, according to the present invention, since the lateral stiffness value is calculated by obtaining the displacement amount of the ground contact surface and the change amount of the ground contact force on the basis of the measured ground contact force of the tire, the distribution of the lateral stiffness, the sharing rate, and the like can be obtained. For example, for the lateral stiffness of the entire tire under a certain traveling condition, the lateral stiffness sharing rate of each ground contact portion can be obtained from the force generated by each ground contact portion in the widthwise direction and the displacement amount generated at that time. Therefore, it can be used for analysis of tire characteristics and design and development of tire patterns.

Further, it is preferable for the calculation unit to obtain the ground contact force distribution using the ground contact forces measured by the sensors, identify, from the ground contact force distribution, a plurality of rib regions that divide the entire ground contact surface of the tire in the widthwise direction, calculate, for each of the identified rib regions, the displacement amount in the widthwise direction of the center position of each rib region, and at the same time, calculate, for each rib region, the change amount of the cumulative value of the ground contact forces in the widthwise direction and corresponding to the displacement amount, and calculate, for each of the rib regions, the lateral stiffness for each rib region from the displacement amount of the center position and the change amount of the cumulative value of the ground contact forces.

According to this configuration, the lateral stiffness can be calculated for each rib provided on the tire, and thus it is possible to find which part of the rib provided on the tire exerts or does not exert the force. Therefore, the tire testing apparatus of the present invention is a very important tool for tire development and suspension design.

Further, it is preferable for a display unit for displaying an image output by the calculation unit to be provided, and for the calculation unit to generate an image showing, for each of the rib regions, the calculated displacement amount in a widthwise direction, the calculated change amount of the cumulative value of the ground contact forces in the widthwise direction, and the calculated lateral stiffness, thereby displaying the generated image on the display unit.

According to the above configuration, the user can easily confirm the characteristics of each rib of the tire by looking at the image on the display unit.

Further, the present invention is a drum-type tire testing apparatus for performing a test by rotating a tire while the tire is in contact with a drum, the apparatus including a plurality of sensors provided on the outer circumferential surface of the drum and arranged side by side along a widthwise direction of the drum for measuring ground contact forces at ground contact positions of the tire in contact with the tire, and a calculation unit for obtaining, based on the ground contact forces measured by the plurality of sensors, a displacement amount, in a front-rear direction of the tire, of the ground contact positions and a change amount of the ground contact force, corresponding to the displacement amount, in the front-rear direction, thereby calculating a front-rear stiffness from the displacement amount and the change amount of the ground contact force.

As described above, the present invention obtains, based on the measured ground contact force of the tire, the displacement amount of the ground contact surface and the change amount of the ground contact force to calculate the front-rear stiffness of the tire, and thus it is possible to obtain the distribution and sharing rate and the like of the front-rear stiffness. For example, the front-rear stiffness of the entire tire under a certain running condition can be obtained from the force generated by each ground contact portion of the tire and the displacement amount generated at that time, and the front-rear stiffness sharing rate of each ground contact portion can be obtained. Therefore, it can be used for analysis of tire characteristics and design and development of tire patterns.

In addition, it is preferable that the calculation unit obtain the ground contact force distribution using the ground contact forces measured by the sensors, identify, from the ground contact force distribution, a plurality of rib regions that divide along a widthwise direction the entire ground contact surface of the tire, and at the same time, identify, for each of the rib regions, block regions that divide the rib region in the widthwise direction, calculate, for each of the identified block regions, the displacement amount of the center position of each block region in the front-rear direction of the tire, and at the same time, calculate, for each of the block regions, a change amount of a cumulative value of the ground contact forces in the front-rear direction of the tire and corresponding to the displacement amount, and calculates, for each of the block regions, the front-rear stiffness for each of the block regions from the displacement amount of the center position and the change amount of the cumulative value of the ground contact forces.

According to this configuration, the front-rear stiffness can be calculated for each block region provided on the tire, and as a result, it is possible to find which part of the block provided on the tire exerts or does not exert force.

The front-rear stiffness for each block region is the stiffness sharing rate of each block region in which the tread surface of the tire is compartmentalized by a vertical groove (rib groove) and a horizontal groove (lug groove), and by assessing the variation of the stiffness sharing rate in the ground contact surface, it is expected to be possible to contribute to the designing of pattern and the analysis of uneven wear. In addition, the front-rear stiffness is said to lead to a time delay in the braking and driving force of the tire, and is one of the important parameters in the response speed during braking and driving of the vehicle, and as a result, it may be useful data for not only evaluation of the tire itself but also improvement of the vehicle control system, such as ABS and the like, using the braking and driving force of the tire.

Advantageous Effects of Invention

The present invention can provide a tire testing apparatus which can be used for the analysis of tire characteristics and the design and development of a tire pattern by obtaining not the stiffness of the tire as a whole but the stiffness sharing rate and stiffness distribution of each of the ground contact portions.

BRIEF DESCRIPTION OF DRAWINGS

FIGS. 7($a$)-($c$) are diagrams for explaining arithmetic processing of a displacement amount of the ground contact surface performed by the tire testing apparatus according to the first embodiment of the present invention.

FIGS. 8($a$)-($c$) are diagrams illustrating arithmetic processing of a change amount distribution of a ground contact force performed by the tire testing apparatus according to the first embodiment of the present invention.

FIGS. 12($a$)-($c$) are diagrams showing an example of ground contact force data measured by the tire testing apparatus according to the second embodiment of the present invention.

FIGS. 13($a$)-($d$) are schematic diagrams for explaining processing in which the tire testing apparatus according to the second embodiment of the present invention obtains a center point of a block region of a tire from ground contact force data.

DESCRIPTION OF EMBODIMENTS

Hereinafter, embodiments (a first embodiment and a second embodiment) of the present invention will be described with reference to the drawings.

First Embodiment

First, a tire testing apparatus 10 according to a first embodiment of the present invention will be described.

Figure 1:
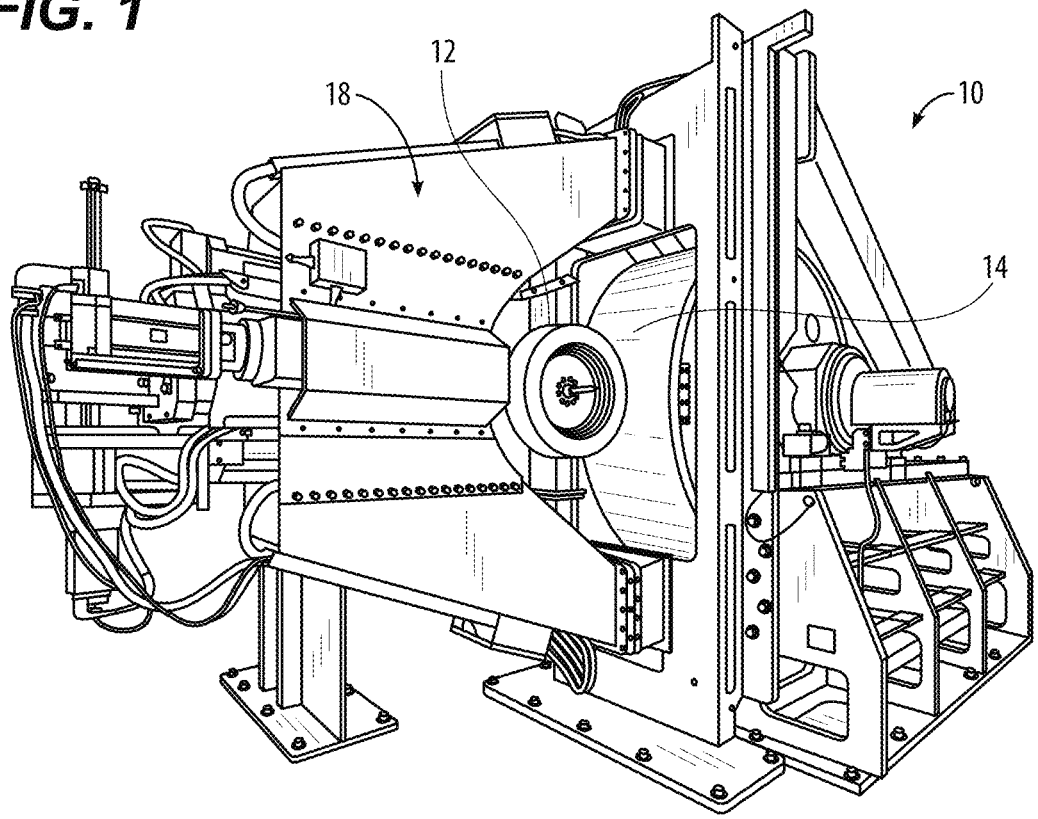
FIG. 1 is an external view showing the entirety of one example of a tire testing apparatus according to first and second embodiments of the present invention.
Figure 2:
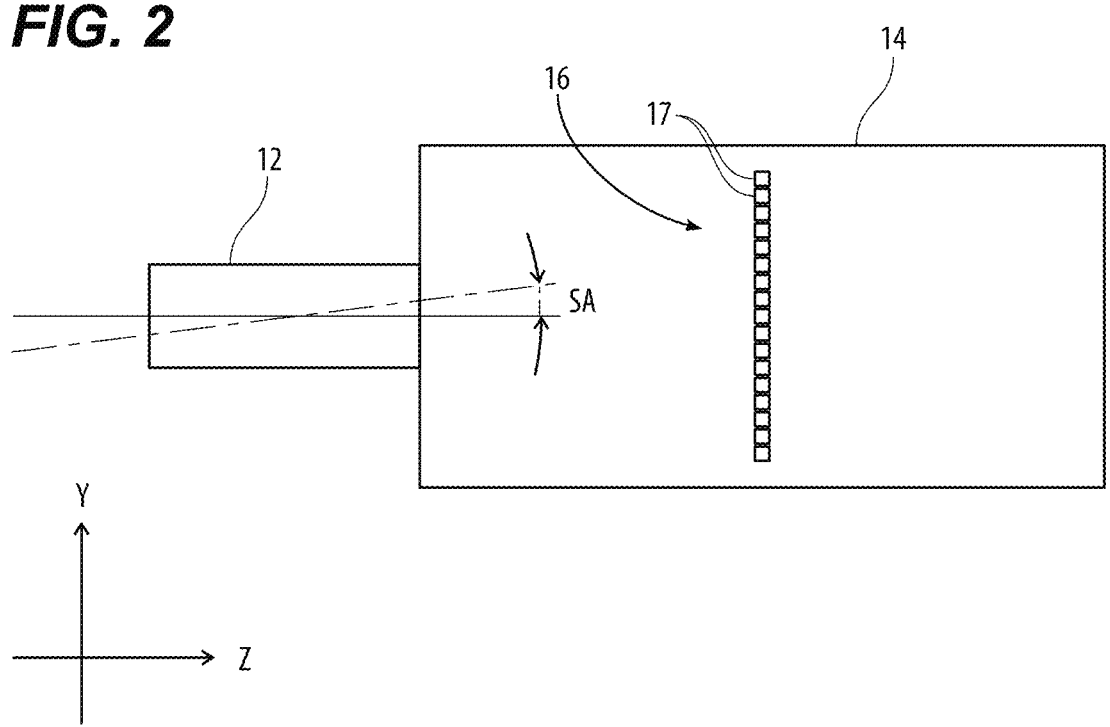
FIG. 2 is a plan view showing a tire and a drum in the tire testing apparatus of FIG. 1.
Figure 3:
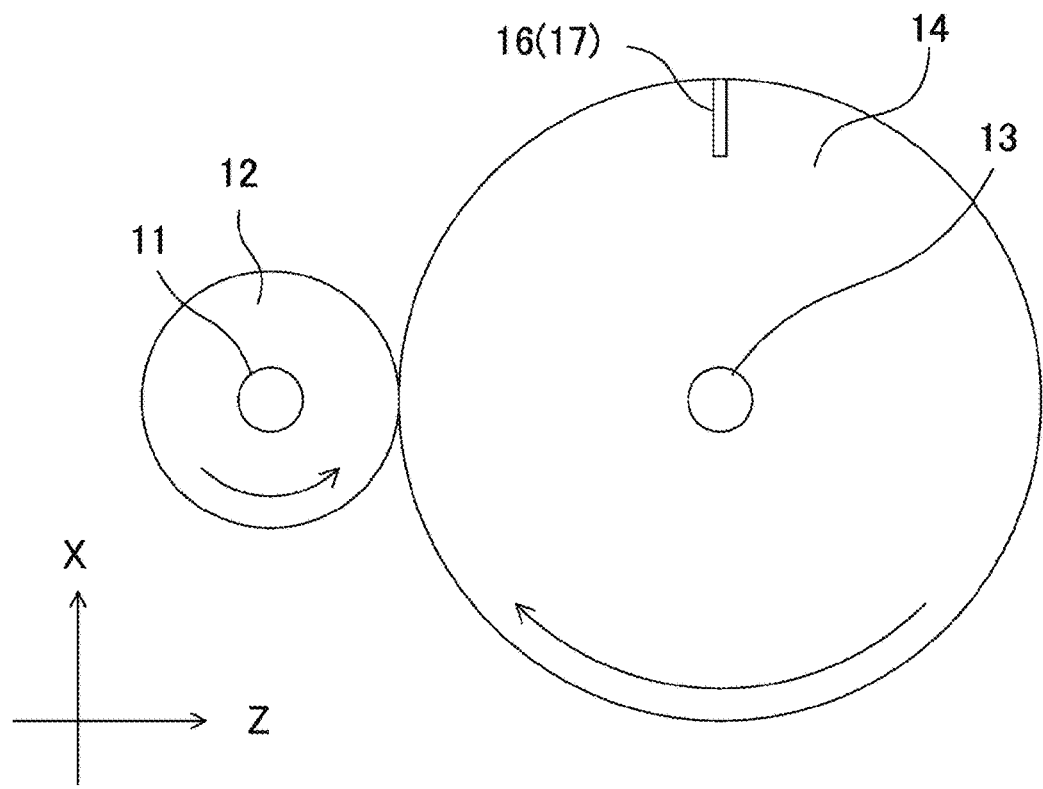
FIG. 3 is a side view showing a tire and a drum in the tire testing apparatus of FIG. 1.

FIG. 1 is an external view of a tire testing apparatus 10 to which embodiments (a first embodiment and a second embodiment) of the present invention are applied, and FIGS. 2 and 3 are respectively a plan view and a side view showing a relationship between a tire 12 to be tested and a drum 14 of the tire testing apparatus 10.

The tire testing apparatus 10 illustrated in these drawings is a drum-type testing apparatus that measures the ground contact force of the tire 12, and the testing is performed while the subject tire 12 is brought into ground-contact with the outer circumferential surface (drum surface) of the drum 14 rotating about the drum shaft 13.

A ground contact force sensor unit 16 that measures a ground contact force of the tire 12 is provided on a part of the drum surface. The ground contact force sensor unit 16 includes a plurality of sensors 17 measuring each of three-component forces (X-axis, Y-axis, and Z-axis) of the ground contact force. The sensors 17 are each configured by attaching a strain gauge to a strain-induced body, and for example, a "Force Matrix Sensor" (FMS) manufactured by the applicant may be used. The plurality of sensors 17 are arranged in the widthwise direction (in the Y-axis direction illustrated in FIG. 2) of the drum 14, and for example, 80 of such sensors 17 are linearly arranged in a line with a slight gap therebetween. Each sensor 17 is mounted and embedded in the drum 14, and its outer surface is coplanar with the drum surface. Here, a traveling direction (front-rear direction) of the tire 12 is an X axis, the widthwise direction of the drum 14 (and the tire 12) is a Y-axis, and the direction in which the tire 12 and the drum 14 approach each other is a Z-axis.

The subject tire 12 is attached to a tire support mechanism 18. The tire support mechanism 18 is configured to support the tire 12 to be rotatable around the tire shaft 11 and to move the tire 12 back and forth with respect to the drum 14, thereby controllably bringing the tire 12 into contact with or away from the outer circumferential surface of the drum 14. In addition, the tire support mechanism 18 can perform control to relatively laterally move the tire 12 in the widthwise direction of the drum 14 with respect to the drum 14 and adjust an angle SA (see FIG. 2) of the tire with respect to the drum 14. In addition, the tire support mechanism 18 includes force sensors capable of measuring three-direction forces on a connection shaft with the tire shaft 11, and can measure a total value of the tire-ground contact forces.

Figure 4:
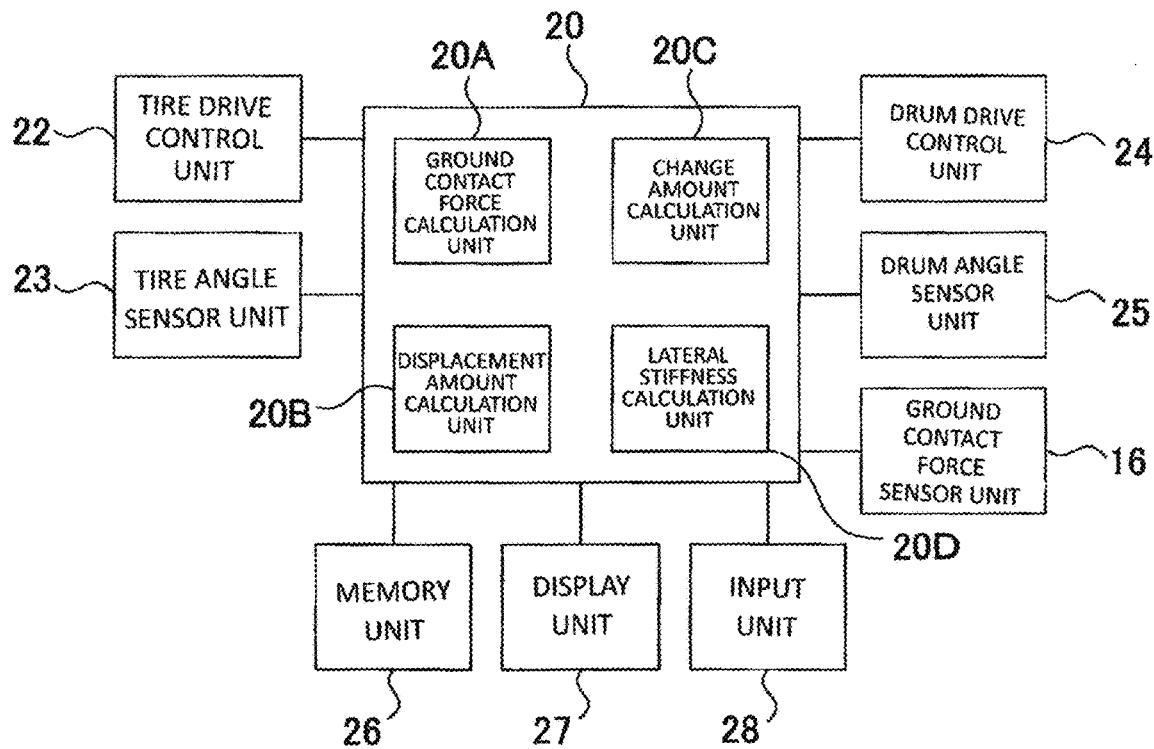
FIG. 4 is a control block diagram of the tire testing apparatus according to the first embodiment of the present invention.

FIG. 4 is a control block diagram of the tire testing apparatus 10. As shown in the drawing, the tire testing apparatus 10 includes a ground contact force sensor unit 16, a calculation unit 20, a tire drive control unit 22, a tire angle sensor unit 23, a drum drive control unit 24, a drum angle sensor unit 25, a memory unit 26, a display unit 27, and an input unit 28.

The tire drive control unit 22 is a circuit that controls the drive of the tire support mechanism 18 described above, and the movement of the tire 12 with respect to the drum 14 and the adjustment of the angle SA are controlled by the tire drive control unit 22.

The drum drive control unit 24 is a circuit that controls the rotation of the drum 14, and the rotation and load of the drum 14 are controlled by the drum drive control unit 24.

The tire angle sensor unit 23 is a sensor that detects the rotation angle of the tire 12, and the rotation angle of the tire 12 is measured by a rotary encoder or the like provided on the tire shaft 11. The drum angle sensor unit 25 is a sensor that detects the rotation angle of the drum 14, and the rotation angle of the drum 14 is measured by a rotary encoder or the like provided on the drum shaft 13. The rotation angles measured by the tire angle sensor unit 23 and the drum angle sensor unit 25 are transmitted to the calculation unit 20. In addition, a measured value of the ground contact force measured by the ground contact force sensor unit 16 is also transmitted to the calculation unit 20.

The calculation unit 20 is a circuit including a CPU, a memory, and the like that execute arithmetic processing of a program, and includes a ground contact force calculation unit 20A that calculates a ground contact force, a displacement amount calculation unit 20B that calculates a displacement amount of a ground contact position, a change amount calculation unit 20C that calculates a change amount of the ground contact force corresponding to the displacement, and a lateral stiffness calculation unit 20D that calculates a lateral stiffness on the basis of the displacement amount and the change amount.

The function of each of the calculation units (the ground contact force calculation unit 20A, the displacement amount calculation unit 20B, the change amount calculation unit 20C, and the lateral stiffness calculation unit 20D) is realized by the above-described CPU executing arithmetic processing of the program. The arithmetic processing of each calculation unit will be described later.

The memory unit 26 is an RAM, a hard disk, or the like that stores information, and a result or the like calculated by the calculation unit 20 is recorded in the recording unit 26. The display unit 27 is a display or the like that displays information, and the input unit 28 is a keyboard, a mouse, or the like through which information can be input. A touch panel or the like in which the display unit 27 and the input unit 28 are integrated may be used.

Figure 5:
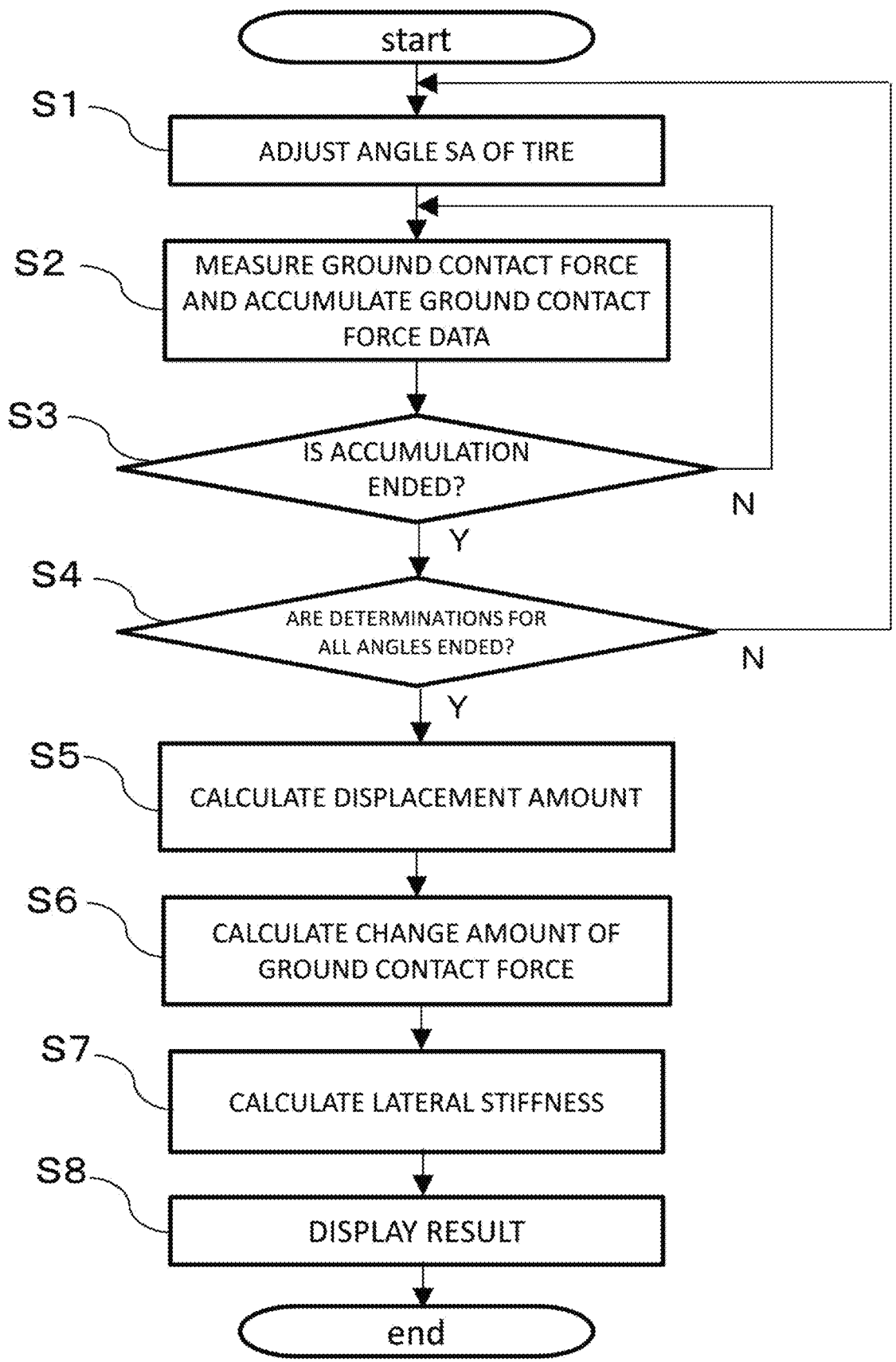
FIG. 5 is a flowchart showing an example of a processing process of the tire testing apparatus according to the first embodiment of the present invention.

FIG. 5 shows an example of a processing process of the tire testing apparatus 10. This drawing illustrates an example in which the processing (S1 to S4) related to the accumulation of the ground contact force data and the processing (S5 to S8) related to the calculation of the lateral stiffness are continuously performed, but the processing may be performed separately.

First, the angle SA of the tire 12 is adjusted (S1). That is, the angle SA of the subject tire 12 attached to the tire support mechanism 18 is adjusted to a set angle by the tire drive control unit 22.

In the first embodiment, first, the tire drive control unit 22 adjusts the angle SA of the tire 12 to "0 deg (angle at which the tire 12 goes straight)".

Next, the ground contact force is measured and the ground contact force data is accumulated (S2). That is, while the rotation and movement of the tire 12 are controlled by the tire drive control unit 22 to bring the tire 12 into contact with the drum 14 and the rotation of the drum 14 is controlled by the drum drive control unit 24, the ground contact force is measured by the ground contact force sensor unit 16. Then, the ground contact force sensor unit 16 stores the ground contact force data obtained by the measurement in the memory unit 26. At this time, the angle SA of the tire 12, the rotation angle of the tire 12 measured by the tire angle sensor unit 23 or the drum angle sensor unit 25, and the rotation angle of the drum 14 are recorded in the memory unit 26 in association with the ground contact force data. A sufficient amount of ground contact force data is accumulated by continuously recording for a certain period of time. Since the tire 12 and the drum 14 usually have different diameters, the position (angle) of the ground contact surface of the tire 12 on the tire 12 changes with the rotation of the ground contact surface with respect to the ground contact force sensor unit 16. For this reason, enormous ground contact force data is accumulated for the case in which the rotation angle of the tire 12 and the rotation angle of the drum 14 are different.

The accumulation of the ground contact force data is repeatedly performed until the ground contact force data in substantially the entire circumference of the tire 12 is accumulated (for example, until a set time elapses) (S3). After the accumulation of the ground contact force data is completed, the ground contact force sensor unit 16 determines whether data from another angle SA is necessary (S4), and when it is necessary data, S1 is returned to, the tire drive control unit 22 adjusts the angle SA of the tire 12, and the processes of S2 and S3 are repeated. In the adjustment of the angle SA, the angle SA is adjusted at 1 deg intervals, for example, and the ground contact force data is accumulated.

In the first embodiment, when the accumulation of the ground contact force data in which the angle SA of the tire 12 is "0 deg" is completed, the processing returns to S1, and the tire drive control unit 22 adjusts the angle SA of the tire 12 to "1 deg (an angle at which the tire is in the lateral slip state)" and repeats the processing of S2 and S3 to accumulate the ground contact force data in substantially the entire circumference of the tire 12 in which the angle SA of the tire 12 is "1 deg".

Figure 6:
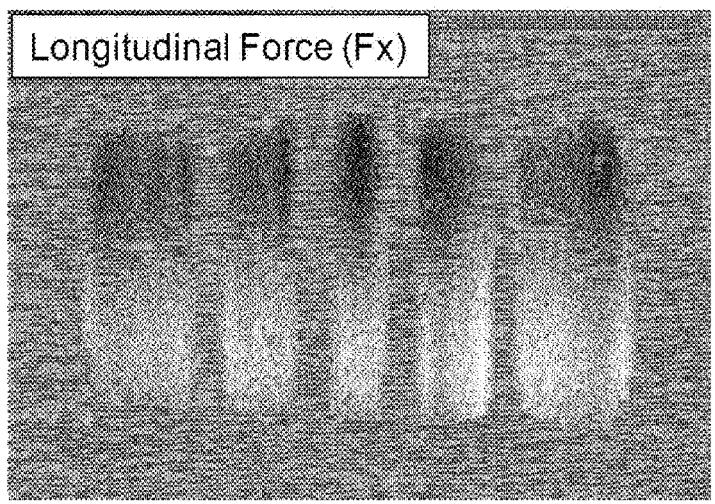
FIGS. 6($a$)-($c$) are diagrams showing an example of ground contact force data measured by the tire testing apparatus according to the first embodiment of the present invention.
Figure 6:
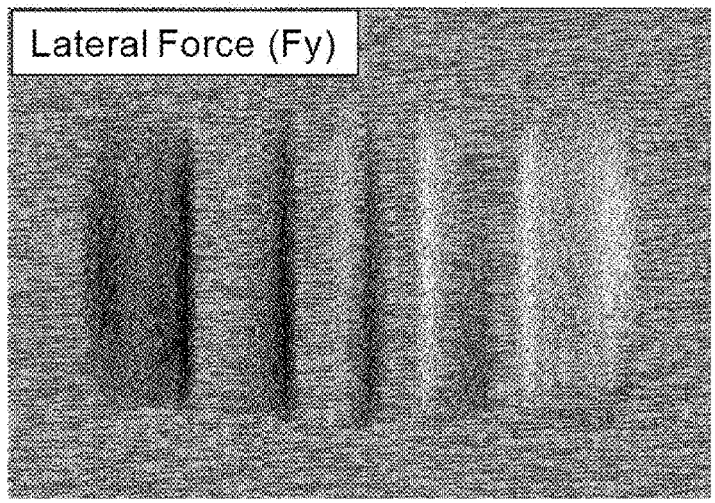
Figure 6:
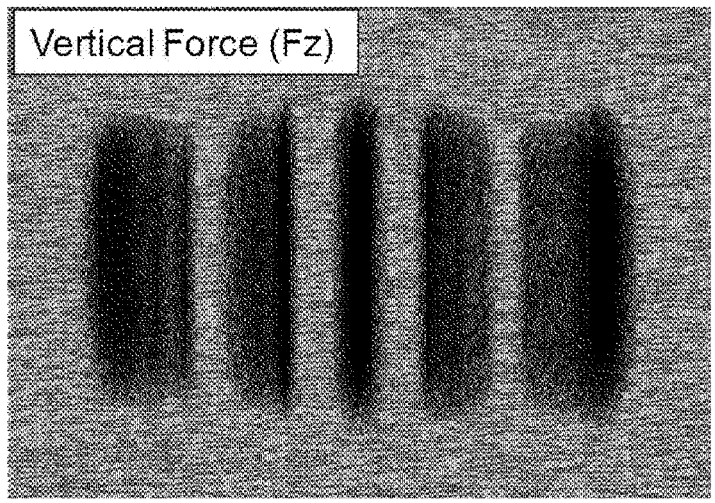

Now, the accumulated ground contact force data will be explained. FIGS. 6(a)-(c) show shows an example of ground contact force data (footprint) at certain positions of the tire 12. FIG. 6(a) represents data of ground contact force Fx in the X-axis direction, FIG. 6(b) represents data of ground contact force Fy in the Y-axis direction, and FIG. 6(c) represents data of the ground contact force Fz in the Z-axis direction. In FIGS. 6(a)-(c), a darker portion indicates a larger force, and it can be seen from the distribution shape that the tire 12 is a rib tire (a tire having ribs). That is, it can be seen that the tire 12 has four grooves formed at regular intervals in the widthwise direction, and has five ribs (portions to be grounded).

Hereinafter, an example in which the lateral stiffness is obtained by dividing the ground contact force data (footprint) shown in FIGS. 6(a)-(c) for each rib will be described. The lateral stiffness is calculated using the ground contact force data having different angles SA. Here, the lateral stiffness is calculated from the ground contact force data of the case when the angle SA=0 (deg, hereinafter, units are omitted.) and the case when the ground contact force data SA=1 while the lateral stiffness is being generated between these two cases.

Before calculation of the lateral stiffness, first, the displacement amount Dy of the ground contact position of the tire 12 is calculated (S5).

In S5, the displacement amount calculation unit 20B determines the rib region (rib) using the data (Fz distribution data) of the ground contact force Fz in the Z-axis direction in the ground contact force data (footprint). In the determination of the rib region, the displacement amount calculation unit 20B performs binarization processing using a threshold on the Fz distribution data, and performs contact/non-contact determination processing using the binarized data (ground contact force distribution).

In addition, the displacement amount calculation unit 20B sets a point determined to be in contact in the determination processing as a contact point, obtains coordinate points of left and right ends for each rib region from a point group determined to be a contact point, and determines a range between the left and right ends as a rib region. Further, the displacement amount calculation unit 20B obtains a center line (a center line in the widthwise direction (Y-axis direction) of the tire) of each rib region. Specifically, the displacement amount calculation unit 20B obtains the center line (the center line in the widthwise direction of the tire (the center line in the Y-axis direction)) of each rib region from the data (Fz distribution data) of ground contact force Fz of SA=0, and obtains the center line (the center line in the widthwise direction of the tire (the center line in the Y-axis direction)) of each rib region from the data (Fz distribution data) of ground contact force Fz of SA=1.

In S5, the displacement amount calculation unit 20B obtains the displacement amount Dy by comparing the center line with SA=0 and SA=1 for each rib region. FIGS. 7(a)-(c) are diagrams illustrating calculation processing of the displacement amount Dy at the ground contact position. FIG. 7(a) illustrates the ground contact force data (footprint), and FIG. 7(b) shows a state in which the footprint is binarized to specify the range of the rib region. In FIGS. 7(a) and 7(b), data of SA=0 is shown on the right side of the drawing, and data of SA=1 is shown on the left side of the drawing. On the other hand, FIG. 7(c) shows the positions of the rib regions of SA=0 and SA=1 in an overlapping manner, and the dotted line indicates the center position of the range. As can be seen from the drawing, when SA=0 changes to SA=1, the center position of the rib moves to the left side. The displacement amount calculation unit 20B obtains this movement amount as the displacement amount Dy for each range (rib region).

Next, the change amount in the ground contact force (the widthwise direction (Y-axis direction) of the tire 12) of each rib region is calculated (S6).

In S6, first, the ground contact force calculation unit 20A specifies the rib region using the "coordinate points of the left and right ends of each rib region" obtained in S5 with respect to the data (Fy distribution data) of the ground contact force Fy in the Y-axis direction in the ground contact force data (footprint). In addition, the ground contact force calculation unit 20A obtains a cumulative value of the ground contact force Fy for each specified range (rib region) using the data (Fy distribution data) of the ground contact force Fy in the Y-axis direction. The ground contact force calculation unit 20A obtains the cumulative value of the ground contact force Fy for each rib region using the data (Fy distribution data) of the ground contact force Fy of SA=0, and obtains the cumulative value of the ground contact force Fy for each rib region using the data (Fy distribution data) of the ground contact force Fy of SA=1.

Thereafter, the displacement amount calculation unit 20C compares the obtained cumulative values between SA=0 and SA=1, and calculates the difference as the change amount ΔFy. FIGS. 8(*a*)-(*c*) are diagrams for illustrating calculation processing of the change amount ΔFy of the ground contact force. FIG. 8(*a*) shows a state in which the ground contact force data (footprint) is specified by being surrounded by a frame for each rib. FIG. 8(*b*) shows a result of obtaining the cumulative value of the ground contact force within the specified range for each rib. In FIGS. 8(*a*) and 8(*b*), the upper side is data of SA=0, and the lower side is data of SA=1. On the other hand, FIG. 8(*c*) illustrates a result of obtaining the difference between SA=0 and SA=1 for each range (rib) as the displacement amount ΔFy.

Next, the lateral stiffness calculation unit 20D obtains a lateral stiffness sharing rate Ky rib by using the displacement amount Dy and the change amount ΔFy of the ground contact force (S7).

In S7, the lateral stiffness calculation unit 20D obtains the lateral stiffness sharing rate Ky rib in each range (rib region) using the displacement amount Dy at the ground contact position obtained in S5, the change amount ΔFy of the ground contact force obtained in S6, and the following (Equation 1). Specifically, the lateral stiffness calculation unit 20D substitutes the displacement amount Dy at the ground contact position obtained in S5 and the change amount ΔFy of the ground contact force obtained in S6 into the following (Equation 1) to calculate the lateral stiffness sharing rate Kyrib for each rib.

$$Kyrib = \Delta Fy / Dy \quad \text{(Equation 1)}$$

Next, the lateral stiffness calculation unit 20D displays the obtained sharing rate Ky rib on the display unit 27 (S8). For example, the lateral stiffness calculation unit 20D generates an image (see FIGS. 9(*a*)-(*c*)) indicating the calculated displacement amount in the widthwise direction, the calculated change amount of the cumulative value of the ground contact force in the widthwise direction, and the calculated lateral stiffness for each rib region, and displays the generated image on the display unit 27.

Figure 9:
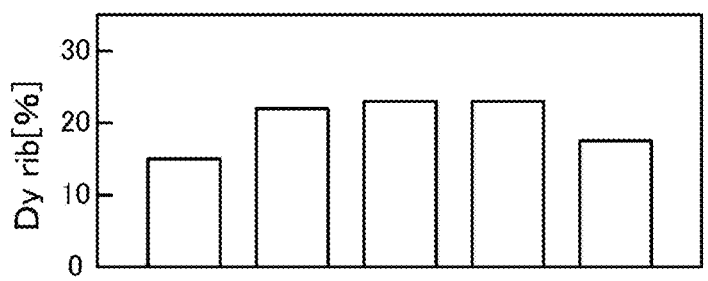
FIGS. 9($a$)-($c$) are diagrams showing a display example of a calculation result by the tire testing apparatus of the first embodiment of the present invention.
Figure 9:
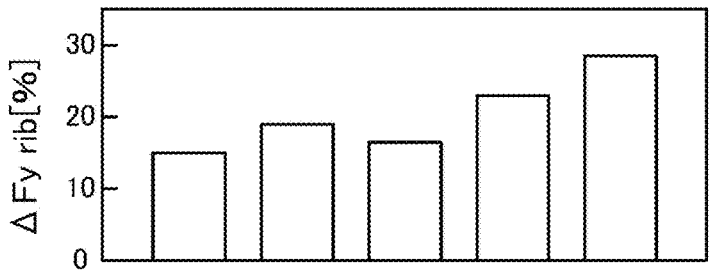
Figure 9:
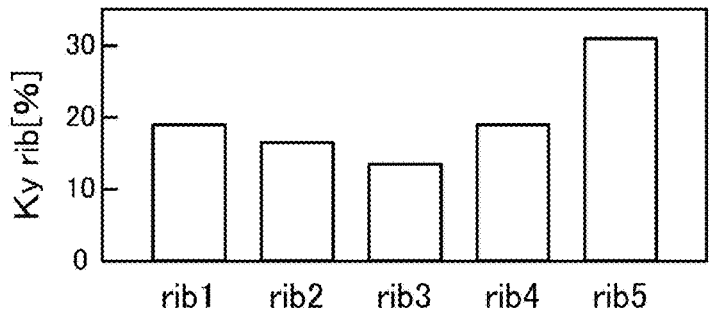

Here, FIGS. 9 (*a*)-(*c*) show a display example. FIG. 9(*a*) shows the displacement amount Dy at the ground contact position, FIG. 9(*b*) shows the change amount ΔFy of the ground contact force, and FIG. 9(*c*) shows the lateral stiffness Ky. In this drawing, the longitudinal direction indicates the ratio of each rib in the whole. The longitudinal direction may be indicated by a numerical value using each unit.

As can be seen from FIGS. 9(*a*)-(*c*), the displacement amount Dy in the widthwise direction is large at the center (ribs 2, 3, and 4) of the tire, and small at the inner side (rib 1) and the outer side (rib 5). On the other hand, the change amount ΔFy of the ground contact force Fy in the widthwise direction is the largest on the outer side (rib 5) and gradually decreases toward the inner side (rib 1), but decreases at the center (rib 3). The lateral stiffness Ky obtained from the displacement amount Dy and the change amount ΔFy is the largest on the outer side (rib 5), decreases toward the center (rib 3), and increases again toward the inner side (rib 1).

As described above, according to the first embodiment, the lateral stiffness Ky of the entire tire can be obtained as the sharing rate Ky rib in the widthwise direction of the drum 14, and the characteristics of the tire 12 can be analyzed.

In addition, according to the first embodiment, since the sharing rate Kyrib in the widthwise direction is calculated for each rib of the tire 12, it is possible to understand which of the ribs provided on the tire 12 is exerting force or not exerting force. Therefore, the tire testing apparatus 10 of the first embodiment is a very important tool in analyzing tire characteristics, designing and developing a tire pattern, and designing a suspension.

In the first embodiment described above, the example in which the change amount ΔFy of the ground contact force is obtained after the displacement amount Dy of the ground contact position is obtained has been described, but the displacement amount Dy of the ground contact position may be obtained after the change amount ΔFy of the ground contact force is obtained, or both processes may be performed simultaneously. However, in both processes, it is necessary to make specified ranges (ranges of ribs) correspond to each other. In the above-described embodiment, as a method of specifying the range, the range is surrounded by a frame or binarized, but it is sufficient for the ranges to be substantially the same, and the same specifying method may be used. In addition, before both processes, a process of specifying a range may be performed, and both processes may be performed on the basis of the specified range.

In the above-described embodiment, the range is specified for each rib region, and the lateral stiffness in the range is obtained, but the present invention is not limited thereto, and the lateral stiffness at a certain point or a certain block pattern region may be obtained. For example, the lateral stiffness may be calculated by obtaining the displacement amount Dy and the displacement amount ΔFy of the ground contact force at the outermost point, the innermost point, the central point, and the like of the tire 12. In addition, the lateral stiffness Ky of the entire tire may be calculated using the total value of the change amounts ΔFy of the tire-ground contact forces by a force sensor capable of measuring the three-direction forces mounted on the tire connection shaft of the tire support mechanism 18.

Second Embodiment

Next, a tire testing apparatus according to a second embodiment of the present invention will be described.

In the description of the second embodiment, for convenience of description, the same reference numerals are given to the same configurations (or corresponding configurations) as those of the first embodiment described above, and the description thereof will be omitted or simplified.

First, a schematic configuration of the tire testing apparatus 10 of the second embodiment of the present invention will be described.

Similarly to the first embodiment, the tire testing apparatus 10 of the second embodiment is a drum-type testing apparatus that measures the ground contact force of the tire 12, and is configured such that the ground contact force of the tire 12 is measured by a test by grounding the subject tire 12 on the outer circumferential surface (drum surface) of the drum 14 rotating about the drum shaft 13 (see FIG. 1).

In the drum 14, similarly to the first embodiment, the ground contact force sensor unit 16 that measures the ground contact force of the tire 12 is provided on a part of the outer circumferential surface (drum surface) (see FIGS. 2 and 3). Similarly to the first embodiment, the ground contact force sensor unit 16 includes a plurality of sensors 17 (for example, 80 sensors 17) each measuring three-component forces (X-axis, Y-axis, and Z-axis) of the ground contact force. In addition, the tire support mechanism 18 is configured to support the tire 12 to be retable around the tire shaft 11 and to move the tire 12 back and forth with respect to the drum 14 thereby controllably bringing the tire 12 into contact with or away from, the outer circumferential surface of the drum 14.

Next, a functional configuration of the tire testing apparatus 10 according to the second embodiment will be described with reference to FIG. 10.

Figure 10:
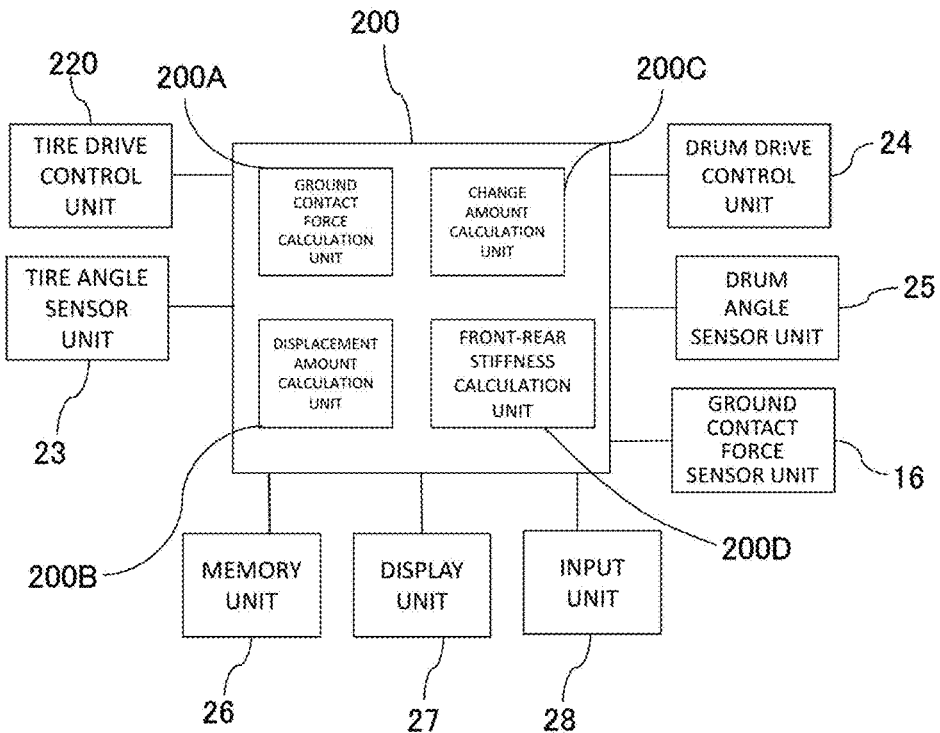
FIG. 10 is a control block diagram of the tire testing apparatus according to a second embodiment of the present invention.

Here, FIG. 10 shows a control block diagram of the tire testing apparatus 10 of the second embodiment.

As shown in the drawing, the tire testing apparatus 10 of the second embodiment includes the ground contact force sensor unit 16, a calculation unit 200, a tire drive control unit 220, the tire angle sensor unit 23, the drum drive control unit 24, the drum angle sensor unit 25, the memory unit 26, the display unit 27, and the input unit 28.

Among the above components, the components other than the tire drive control unit 220 and the calculation unit 200 (the ground contact force sensor unit 16, the tire angle sensor unit 23, the drum drive control unit 24, the drum angle sensor unit 25, the memory unit 26, the display unit 27, and the input unit 28) are the same as those of the first embodiment, and thus the description thereof will be omitted.

The tire drive control unit 220 is a circuit that controls the drive of the tire support mechanism 18, and the movement of the tire 12 with respect to the drum 14 and the adjustment of the angle SA are controlled by the tire drive control unit 220.

Furthermore, the tire drive control unit 220 controls the driving of the tire support mechanism 18 to control the rolling of the tire 12 to achieve the set slip ratio. This slip ratio is defined as shown in the following (Equation 2).

Slip ratio=(Drum speed−Tire speed)/Drum speed  (Equation 2)

Each of the above speeds is a tangential speed at a ground contact center point between the drum 14 and the tire 12.

Specifically, a predetermined "drum speed (constant drum speed)" and an "effective rolling radius" at the time of rolling of the tire 12 are set in the tire drive control unit 220. Regarding the above-described "effective rolling radius", for example, an operator drives the tire testing apparatus 10 as preset processing, and estimates the "effective rolling radius" at the time of rolling of the tire 12 by a rotation angle encoder provided on the tire shaft 11. The operator operates the input unit 28 to input and set the estimated "effective rolling radius" to the tire drive control unit 220.

A target "slip ratio" is set in the tire drive control unit 220. For the "slip ratio", for example, an operator operates the input unit 28 to set a target "slip ratio" in the tire drive control unit 220 as preset processing. In the second embodiment, a case where two types of slip ratios ("Slip ratio=0%" for reproducing movement of tire 12 when traveling straight, "Slip ratio=2%" for reproducing movement of tire 12 when braking) are set in the tire drive control unit 220 will be described as an example. The two types of slip ratios are an example.

Then, the tire drive control unit 220 acquires a "tire rotation angular velocity" detected by the rotation angle encoder of the tire shaft 11, and controls the driving of the tire support mechanism 18 so as to obtain the set "slip ratio" with respect to the set a "constant drum speed" using the acquired "tire rotation angular velocity" and "effective rolling radius" and the above (Equation 2), to thereby control the speed of the tire 12. As a special case of the control, there is also a state in which the control is not performed, that is, the driving force is not generated.

The calculation unit 200 includes a ground contact force calculation unit 200A that calculates the ground contact force, a displacement amount calculation unit 200B that calculates the displacement amount of the ground contact position, a change amount calculation unit 200C that calculates the change amount of the ground contact force corresponding to the displacement, and a front-rear stiffness calculation unit 200D that calculates the front-rear stiffness from the displacement amount and the change amount. The arithmetic processing of each calculation unit will be described later.

The calculation unit 200 is a circuit including a CPU, a memory, and the like that execute arithmetic processing of a program, and the memory stores the program. The function of each calculation unit (the ground contact force calculation unit 200A, the displacement amount calculation unit 200B, the change amount calculation unit 200C, and the front-rear stiffness calculation unit 200D) is implemented by the CPU executing the program.

Next, the front-rear stiffness calculation processing of the tire 12 of the tire testing apparatus 10 of the second embodiment will be described with reference to FIG. 11.

Figure 11:
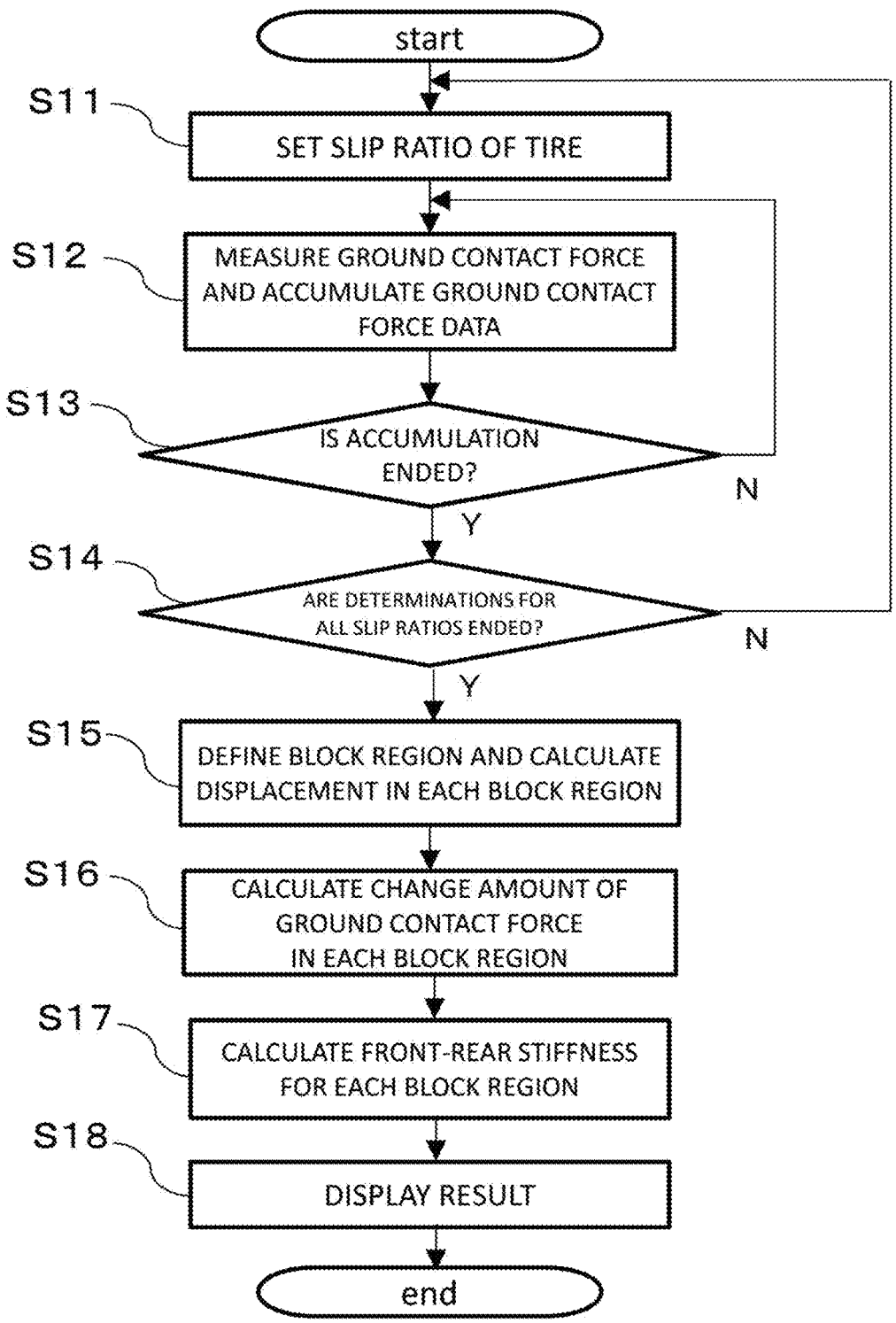
FIG. 11 is a flowchart showing an example of a processing process of the tire testing apparatus according to the second embodiment of the present invention.

Here, FIG. 11 is a flowchart showing an example of a processing process of the tire testing apparatus 10 according to the second embodiment of the present invention. FIG. 11 illustrates an example in which the processing (S11 to S14) related to the accumulation of the ground contact force data and the processing (S15 to S18) related to the calculation of the front-rear stiffness are continuously performed, but the processing may be performed separately.

In the second embodiment, first, the tire testing apparatus 10 is driven to set the slip ratio of the subject tire 12 (the rolling tire 12) mounted on the tire support mechanism 18 (S11). That is, the tire testing apparatus 10 controls the speed of the rolling tire 12 so as to achieve a set "slip ratio". Here, first, an example in which the slip ratio of the tire 12 is set to the slip ratio (0%) at the time of straight traveling will be described.

Specifically, in S11, the drum drive control unit 24 rotates the drum 14 at a predetermined "drum speed". Further, the tire drive control unit 220 drives and controls the tire support mechanism 18 to rotate (roll) the tire 12. At this time, the tire drive control unit 220 acquires the "tire rotation angular velocity" from the rotation angle encoder provided on the tire shaft 11, and controls the drive of the tire support mechanism 18 so that the target "slip ratio=0%" is obtained for the predetermined "drum speed" using the acquired "tire rotation angular velocity", the "effective rolling radius" set in the preset processing, and the above-described (Equation 2), thereby controlling the speed of the tire 12. In particular, in the state in which the control for driving the tire is eliminated, the tire 12 mounted on the tire testing apparatus 10 is in a state of being rotated at the "slip ratio=0%" (the tire 12 is in an operation state when traveling straight).

Next, the tire testing apparatus 10 performs processing similar to S2 of the first embodiment described above, that is, measures the ground contact force and accumulates the ground contact force data (S12). Specifically, in S12, while the rotation and movement of the tire 12 are controlled by the tire drive control unit 220 to bring the tire 12 into contact with the drum 14 and the rotation of the drum 14 is controlled by the drum drive control unit 24, the ground contact force is measured by the ground contact force sensor unit 16. Then, the ground contact force sensor unit 16 stores the ground contact force data obtained by the measurement in the memory unit 26. At that time, the ground contact force sensor unit 16 records the set "slip ratio", the rotation angle of the tire 12 and the rotation angle of the drum 14 measured by the tire angle sensor unit 23 and the drum angle sensor unit 25, and the ground contact force data in the memory unit 26 in association with each other. That is, the ground contact force sensor unit 16 associates the set "slip ratio", the rotation angle of the tire 12, and the rotation angle of the drum 14 with the measured ground contact force data, stores the ground contact force data associated with the slip ratio and the like in the memory unit 26, and proceeds to the processing of S13.

In S13, the tire testing apparatus 10 performs processing similar to S3 of the first embodiment described above. That is, in S13, the tire testing apparatus 10 repeatedly accumulates the ground contact force data until the ground contact force data in substantially the entire circumference of the tire 12 is accumulated (for example, until a set time elapses).

In S14, the ground contact force sensor unit 16 determines whether the ground contact force data of another "slip ratio" is necessary (S14), returns to S11 if necessary, sets the slip ratio of the tire 12 again to another value, and repeats the processing of S12 and S13.

In the second embodiment, a case is exemplified where the ground contact force data of "slip ratio=0%" during straight traveling and the ground contact force data of "slip ratio=2%" during braking are accumulated. Therefore, in S14, when the accumulation of the ground contact force data having the "slip ratio" of "0%" is completed, the ground contact force sensor unit 16 determines that data having the "slip ratio" of "2%" is necessary, and the process returns to S11.

In S11 performed after the processing of S14, the ground contact force sensor unit 16 requests the tire drive control unit 220 to the "change the slip ratio". When the request for "change of slip ratio" is received, the tire drive control unit 220 controls the rotation of the tire 12 such that the slip ratio of the tire 12 becomes "2%". As a result, the tire 12 mounted on the tire testing apparatus 10 is in a rotating state at "slip ratio=2%" (the tire 12 is in an operating state at the time of braking).

That is, the tire drive control unit 220 sets the slip ratio of the rolling tire 12 to "2%", and then repeats the processing of S12 and S13. When the accumulation of the ground contact force data having the "slip ratio" of "2%" is completed, the process of S14 is performed again. In this case, since the accumulation of the ground contact force data with the "slip ratio" of "0%" and the accumulation of the ground contact force data with the "slip ratio" of "2%" are completed, the ground contact force sensor unit 16 determines that no ground contact force data with another "slip ratio" is necessary, and proceeds to the processing of S15.

Now, the ground contact force data accumulated by the processing of S11 to S14 will be explained. FIGS. 12(a)-(c) shows an example of ground contact force data (footprint) at certain positions of the tire 12 in the second embodiment.

FIG. 12(a) represents data of ground contact force Fx in the X-axis direction, FIG. 12(b) represents data of ground contact force Fy in the Y-axis direction, and FIG. 12(c) represents data of the ground contact force Fz in the Z-axis direction. In FIGS. 12(a)-(c), a darker portion indicates a larger force. As can be seen from the illustrated distribution shape, a block divided by a longitudinal groove (rib groove) and a lateral groove (lug groove) is formed in the tire 12.

In the second embodiment, the range of each block of the tire 12 is specified from the ground contact force data accumulated in the processing of S11 to S14, and the front-rear stiffness (the stiffness in the front-rear direction) of the tire is calculated for each specified block. Here, the front-rear stiffness generated between the ground contact force data having the "slip ratio" of "0%" and the ground contact force data having the "slip ratio" of "2%" is calculated.

In the process of calculating the front-rear stiffness, first, the block region of the tire 12 is defined, the displacement amount (Dx) in the front-rear direction of each block region is calculated (S15), and the process proceeds to S16.

Figure 14:
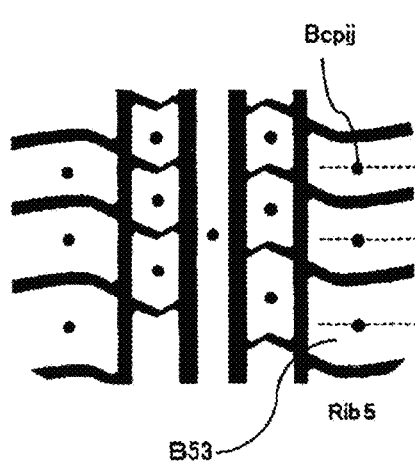
FIGS. 14(a)-(b) are schematic diagrams for explaining processing in which the tire testing apparatus of the second embodiment of the present invention calculates a displacement amount in the front-rear direction of the tire from a center point of a block region of the tire obtained from ground contact force data.
Figure 14:
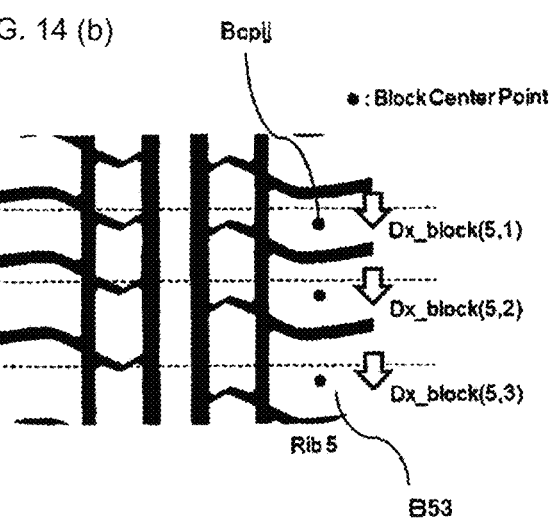

Hereinafter, the process of S15 will be described with reference to FIGS. 13 and 14.

Here, FIGS. 13(a)-(d) are schematic diagrams for explaining a process in which the tire testing apparatus of the second embodiment obtains the center point of the block region of the tire from the ground contact force data, in which (a) is a schematic diagram showing the rib region and the block region obtained from the ground contact force data, (b) is a schematic diagram showing the center point of the rib region obtained from the ground contact force data, and (c) and (d) are schematic diagrams showing the center point of the block region obtained from the ground contact force data.

FIGS. 14(a)-(b) are schematic diagrams for explaining a process in which the tire testing apparatus of the second embodiment calculates a displacement amount of the tire in the front-rear direction from the center point of the block region of the tire obtained from the ground contact force data, (a) is a schematic diagram showing the center point of the block region of the tire obtained from the ground contact force data during straight traveling, and (b) is a schematic diagram showing the center point of the block region of the tire obtained from the ground contact force data during braking.

In S15, the displacement amount calculation unit 200B determines the rib region using the data (Fz distribution data) of the ground contact force Fz in the Z-axis direction in the ground contact force data (footprint). In the determination of the rib region, the displacement amount calculation unit 200B performs binarization processing using a threshold on the Fz distribution data, and performs contact/non-contact determination processing using the binarized data (ground contact force distribution).

In addition, the displacement amount calculation unit 200B sets a point determined to be in contact in the determination processing as a contact point, obtains coordinate points of left and right ends for each rib from a point group determined to be the contact point, and specifies a range between the left and right ends as a rib region Ri (i is a natural number of 1 or more) (see FIG. 13(a)). Thereafter, the displacement amount calculation unit 200B obtains the center line of the rib region Ri (the widthwise direction (the center line in the Y-direction) of the tire 12 (see FIGS. 13(a) and 13(b)). In addition, for each determined rib region Ri, the displacement amount calculation unit 200B sets a region partitioned by the lateral grooves of the tire 12 as a block region Bij (j is a natural number of 1 or more) (see FIG. 13(a)). Here, a plurality of block regions Bij is formed for each rib region Ri. That is, a block region that divides the specified rib region in the widthwise direction is specified.

Further, the displacement amount calculation unit 200B obtains coordinate points on the center line of the rib region Ri where the block region Bij is formed and at the front and rear ends of the block region Bij, and calculates the position of the center point at the front and rear ends as the block center point Bcpij (see FIGS. 13(a) to 13(d)).

Specifically, in S15, the displacement amount calculation unit 200B obtains the rib region Ri of the tire 12 from the ground contact force data (Fz distribution data) at the time of straight traveling (slip ratio=0%), obtains each block region Bij of the tire 12 for each rib region Ri, and calculates the position of the block center point of each block region Bij (block center point Bcpij at the time of straight traveling). In addition, the displacement amount calculation unit 200B obtains the rib region Ri of the tire 12 from the ground contact force data (Fz distribution data) at the time of braking (slip ratio=2%), obtains each block region Bij of the tire 12 for each rib region Ri, and calculates the position (block center point Bcpij at the time of braking) of the block center point Bcp of each block region Bij.

Then, the displacement amount calculation unit 200B calculates a difference between the block center point Bcpij at the time of straight traveling and the block center point Bcpij at the time of braking as the displacement amount for each block region Bij.

FIG. 14(a) shows a schematic diagram of the block center point Bcpij of the block region Bij obtained from the ground contact force data at the time of straight traveling, and FIG. 14(b) illustrates a schematic diagram of the block center point Bcpij of the block region Bij obtained from the ground contact force data at the time of braking.

In the present embodiment, an index for identifying the displacement amount of each block region Bij is defined as "Dx_block (i, j)". Further, "i" is numbered from the left in the lateral direction, and j is numbered from the front in the angular direction of the tire rotation axis, which is a "longitudinal direction" on the ground contact surface of the tire. For example, the movement amount of the blocks at the right end and the lower end in the drawing is Dx_block (5, 3). Dx_block (5, 3) indicates the displacement amount of the third block B53 from the front (upper in the drawing) in the longitudinal direction of the fifth rib R5 from the left of the tire 12.

In S16, a change amount ΔFx_block (i, j) of the ground contact force (the front-rear direction (X-axis direction) of the tire 12) of each block region Bij is calculated.

Hereinafter, the process of S16 will be described in detail.

In S16, first, the ground contact force calculation unit 200A specifies the block region Bij with respect to the data (Fx distribution data) of the ground contact force Fx in the X-axis direction (front-rear direction of the tire 12) in the ground contact force data (footprint) using the "coordinate points of the left and right ends for each rib region Ri" and the "coordinate points of the upper and lower ends for each block region Bij" obtained in S15. Furthermore, the ground contact force calculation unit 200A calculates a cumulative value of the ground contact force for each block Bij using the data of the ground contact force Fx (Fx distribution data).

Specifically, the ground contact force calculation unit 200A obtains a cumulative value (FxBij at the time of straight traveling) of the ground contact force Fx in each block region Bij of the tire 12 from the ground contact force data (Fx distribution data) at the time of straight traveling (slip ratio=0%). Furthermore, the ground contact force calculation unit 200A obtains a cumulative value (FxBij at the time of braking) of the ground contact force Fx in each block region Bij of the tire 12 from the ground contact force data (Fx distribution data) at the time of braking (slip ratio=2%).

In addition, in S16, the change amount calculation unit 200C compares the obtained cumulative value of "slip ratio=0%" with the obtained cumulative value of "slip ratio=2%", and calculates the difference as the change amount ΔFx. That is, the change amount calculation unit 200C calculates, for each block region Bij, a difference between the cumulative value of the ground contact force Fx at the time of straight traveling (FxBij at the time of straight traveling) and the cumulative value of the ground contact force Fx at the time of braking (FxBij at the time of braking) as the change amount (ΔFx_block (i, j)), and proceeds to the processing of S17.

FIGS. 15(a)-(b) show an image of a calculation result of the change amount ΔFx_block (i, j) of the ground contact force in each block region Bij actually measured by the tire testing apparatus of the second embodiment.

Figure 15:
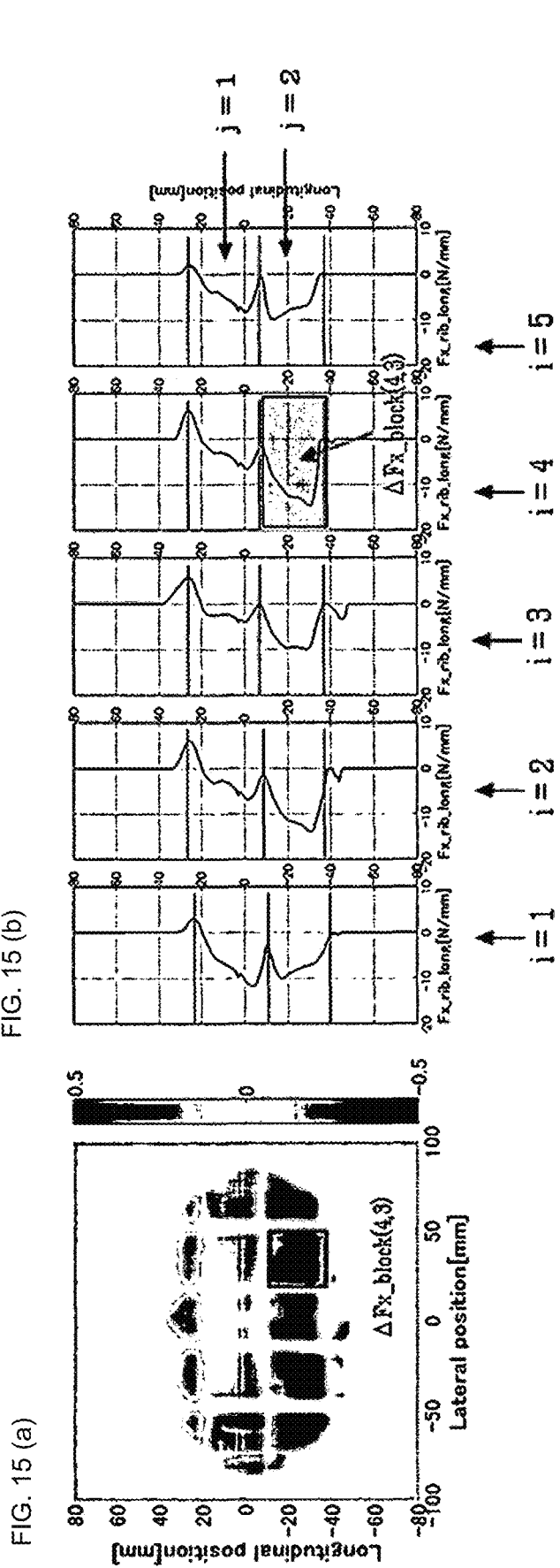
FIGS. 15(a)-(b) are image diagrams showing a calculation result of a change amount of a ground contact force in each block region measured by the tire testing apparatus according to the second embodiment of the present invention.

In FIG. 15, (a) shows a footprint of the change amount ΔFx_block (i, j) of the ground contact force of the tire 12 and (b) shows a graph of the change amount ΔFx_block (i, j) of the ground contact force of the tire 12.

In S17, the front-rear stiffness calculation unit 200D substitutes "Displacement amount of each block region Bij (Dx_block (i, j))" calculated in S15 and "Change amount in each block region Bij (ΔFx_block (i, j))" calculated in S16 into the following (Equation 3) to calculate a front-rear stiffness sharing rate (Kx_block (i, j)) for each block region Bij.

$$Kx\_block(i,j) = \Delta Fx\_block(i,j)/Dx\_block(i,j) \qquad \text{(Equation 3)}$$

In the second embodiment, the front-rear stiffness (Kx) of the entire ground contact surface is defined as the following (Equation 4) using the sum of the front-rear stiffness sharing rates (ΔFx_block (i, j)) of the respective block regions Bij and the average of the displacement amounts Dx_block (i, j) of the respective block regions Bij.

Then, the front-rear stiffness calculation unit 200D calculates the front-rear stiffness (Kx) of the entire ground contact surface by the following (Equation 4).

$$Kx = \sum_{i=1}^{n}\sum_{j=1}^{m} \Delta Fx\_block(i,j) / \left( \sum_{i=1}^{n}\sum_{j=1}^{m} Dx\_block(i,j)/(n*m) \right) \qquad \text{(Equation 4)}$$

Finally, the front-rear stiffness calculation unit 200D generates an image indicating the front-rear stiffness sharing rate (Kx_block (i, j)) of each block region Bij, and displays the generated image on the display unit 27 (S18).

As described above, according to the second embodiment, the front-rear stiffness sharing rate Kx_block (i, j) can be obtained for each block of the tire 12.

The front-rear stiffness sharing rate Kx_block (i, j) is the stiffness sharing rate of each block region Bij in which the tread surface of the tire 12 is compartmentalized by a vertical groove (rib groove) and a horizontal groove (lug groove), and by assessing the variation of the stiffness sharing rate in the ground contact surface, it is expected that it can contribute to the designing of pattern and the analysis of uneven wear.

In addition, the front-rear stiffness sharing rate Kx_block (i, j) is said to lead to a time delay in the braking and driving force of the tire, and is one of the important parameters in the response speed during braking and driving of the vehicle, and as a result, it may be useful data for not only evaluation of the tire itself but also improvement of the vehicle control system, such as ABS and the like, using the braking and driving force of the tire.

As described above, the present embodiments (the first embodiment and the second embodiment) can provide a tire testing apparatus which can be used for the analysis of tire characteristics and the design and development of a tire pattern by obtaining not the stiffness of the tire as a whole but the stiffness sharing rate and stiffness distribution of each of the ground contact portions, for example.

Note that the present invention is not limited to the above-described embodiments, and various modifications can be made within the scope of the gist of the present invention.

REFERENCE SIGNS LIST 10 tire testing apparatus
11 tire shaft
12 tire
13 drum shaft
14 drum
16 ground contact force sensor unit
17 sensor
20 calculation unit
20A ground contact force calculation unit
20B displacement amount calculation unit
20C change amount calculation unit
20D lateral stiffness calculation unit
22 tire drive control unit
23 tire angle sensor unit
24 drum drive control unit
25 drum angle sensor unit
26 memory unit
27 display unit
28 input unit
200 calculation unit
200A ground contact force calculation unit
200B displacement amount calculation unit
200C change amount calculation unit
200D lateral stiffness calculation unit
220 tire drive control unit

The invention claimed is:

1. A drum-type tire testing apparatus for performing a test by rotating a tire while the tire is in contact with a drum, the apparatus comprising:
a plurality of sensors provided on an outer circumferential surface of the drum and arranged side by side along a widthwise direction of the drum to measure ground contact forces at positions in ground contact with the tire; and
a calculation unit for obtaining, based on the ground contact force measured by the sensors, a displacement amount of the ground contact position in the widthwise direction and a change amount of the ground contact force in the widthwise direction corresponding to the displacement amount of the ground contact position, thereby calculating a lateral stiffness based on the displacement amount and the change amount of the ground contact force;
wherein the calculation unit: obtains the ground contact force distribution using the ground contact forces measured by the sensors; identifies, from the ground contact force distribution, a plurality of rib regions that divide the entire ground contact surface of the tire along a widthwise direction; calculates, for each of the identified rib regions, the displacement amount, in the widthwise direction, of the center position of each rib region, and at the same time, calculates, for each rib region, the change amount of the cumulative value of the ground contact forces in the widthwise direction and corresponding to the displacement amount; and calculates, for each of the rib regions, the lateral stiffness for each rib region from the displacement amount of the center position and the change amount of the cumulative value of the ground contact forces.

2. The tire testing apparatus according to claim 1, wherein a display unit for displaying an image output by the calculation unit is provided, wherein the calculation unit generates an image showing, for each of the rib regions, the calculated displacement amount in a widthwise direction, the calculated change amount of cumulative value of the ground contact forces in the widthwise direction and the calculated lateral stiffness, thereby displaying the generated image on the display unit.

3. A drum-type tire testing apparatus for performing a test by rotating a tire while the tire is in contact with a drum, the apparatus comprising:
a plurality of sensors provided on the outer circumferential surface of the drum and arranged side by side along a widthwise direction of the drum for measuring ground contact forces at positions in ground contact with the tire; and
a calculation unit for obtaining, based on the ground contact forces measured by the plurality of sensors, a displacement amount, in a front-rear direction of the tire, of the ground contact positions and a change amount of the ground contact force, corresponding to the displacement amount, in the front-rear direction, thereby calculating a front-rear stiffness from the displacement amount and the change amount of the ground contact force;
wherein the calculation unit: obtains the ground contact force distribution using the ground contact forces measured by the sensors; identifies, from the ground contact force distribution, a plurality of rib regions that divide along a widthwise direction the entire ground contact surface of the tire, and at the same time, identifies, for each of the rib regions, block regions that divide the rib region along the widthwise direction, calculates, for each of the identified block regions, the displacement amount of the center position of each block region in the front-rear direction of the tire, and at the same time, calculates, for each of the block regions, a change amount of cumulative value of the ground contact forces in the front-rear direction of the tire and corresponding to the displacement amount; and calculates, for each of the block regions, the front-rear stiffness for each of the block regions from the displacement amount of the center position and the change amount of the cumulative value of the ground contact forces.

* * * * *